US006957294B1

(12) United States Patent
Saunders et al.

(10) Patent No.: US 6,957,294 B1
(45) Date of Patent: Oct. 18, 2005

(54) DISK VOLUME VIRTUALIZATION BLOCK-LEVEL CACHING

(75) Inventors: Michael J. Saunders, Norristown, PA (US); Vincent S. Yip, Philadelphia, PA (US); Joseph P. Neill, East Fallowfield, PA (US); Richard Grzegorek, Eagleville, PA (US); James R. Hunter, Chadds Ford, PA (US)

(73) Assignee: Unisys Corporation, Blue Bell, PA (US)

( * ) Notice: Subject to any disclaimer, the term of this patent is extended or adjusted under 35 U.S.C. 154(b) by 256 days.

(21) Appl. No.: 10/295,161

(22) Filed: Nov. 15, 2002

(51) Int. Cl.[7] .............................................. G06F 12/00
(52) U.S. Cl. ...................... 711/4; 711/112; 711/111; 711/114; 711/115; 711/161; 711/162; 709/220; 709/221; 709/223; 709/226
(58) Field of Search ........................ 711/111–115, 119, 711/136, 141–143, 153, 173, 4–6, 100–105, 711/161–162; 709/214–215, 217–219, 223, 709/226, 321, 220–221, 229

(56) References Cited

U.S. PATENT DOCUMENTS

| | | | | |
|---|---|---|---|---|
| 5,247,660 A | * | 9/1993 | Ashcraft et al. ............ 707/205 |
| 6,061,763 A | * | 5/2000 | Rubin et al. ................ 711/129 |
| 2002/0091901 A1 | * | 7/2002 | Romm ....................... 711/133 |
| 2002/0103889 A1 | * | 8/2002 | Markson et al. ............ 709/223 |
| 2003/0093647 A1 | * | 5/2003 | Mogi et al. .................... 712/1 |
| 2003/0204671 A1 | * | 10/2003 | Matsunami et al. ........ 711/112 |
| 2004/0044827 A1 | * | 3/2004 | Carlson et al. ................ 711/4 |

* cited by examiner

Primary Examiner—Donald Sparks
Assistant Examiner—Hahem Farrokh
(74) Attorney, Agent, or Firm—Mark T. Starr; Nathan Cass; Lise A. Rode (57) ABSTRACT

The present invention provides systems and methods for allocating a pool of global memory among a set of client/servers so that storage volumes associated with a plurality of client/servers are each allocated a portion of the pool of global memory for caching of data from that volume. The amount of memory to be used for caching the volume's input/output operations (I/Os), the page size, the cache type, the cache replacement policy and the maximum cache read can be specified by volume. The amount of memory to be used for caching the volume's input/output operations, the cache type, the cache replacement policy and the maximum cache read I/O size can be changed dynamically by the changing volume-based attributes.

22 Claims, 4 Drawing Sheets

DISK VOLUME VIRTUALIZATION BLOCK-LEVEL CACHING

FIELD OF THE INVENTION

The invention relates generally to the field of managing storage assets. More particularly, the invention provides a system and method for caching based on volumes rather than disks or files.

BACKGROUND

Information is critical to the success of nearly every kind of business imaginable. Until recently, direct-attached storage typically provided capacity to applications running on a server. Typically, this meant one or more disk drives connected via a Small Computer System Interface (SCSI) located inside the server or connected externally to the server. Today, businesses are finding that these legacy storage architectures no longer meet their needs. In addition to a dramatic increase in the need for capacity, today's businesses may require data sharing, high performance, high availability and cost control.

Storage consolidation is one way in which the expanding needs of businesses are being addressed. Storage consolidation means centralizing and sharing storage resources among a number of application servers. Storage consolidation is often enabled by a Storage Area Network (SAN). A SAN provides high-speed connections between servers and storage units so that many servers can share capacity residing on a single storage subsystem. One drawback, however, is the cost: these storage subsystems are expensive.

Another approach to solving capacity problems is to improve performance. Disk drives are notoriously slow because they are mechanical devices, i.e., the disk has to spin, and the read/write heads have to move across the disk. Latencies are enormous in comparison to speeds at which memory accesses can occur. To address these performance issues, frequently caching is employed.

Caching is a way of speeding up access to frequently used information for faster response. A cache can be a reserved section of main memory or it can be an independent high-speed storage device.

A memory cache is a small block of high-speed memory located between the CPU and the main memory. By keeping as much frequently-accessed information as possible in high-speed memory, the processor avoids the need to access slower memory. A disk cache is a mechanism for improving the time it takes to read from or write to a hard disk. The disk cache may be part of the hard disk or it can be a specified portion of memory.

Disk caching works under the same principle as memory caching, that is, the most recently accessed data from the disk (as well as a certain number of sectors adjacent thereto) is stored in a memory buffer. When an application needs to access data from the disk, it first checks the disk cache to see if the data is there. Disk caching can dramatically improve the performance of applications, because accessing a byte of data in memory can be thousands of times faster than accessing a byte of data on a hard disk. Disk caching is typically done on a physical disk or file basis.

Typically, in a storage subsystem either all the disks in a storage subsystem are cached or they are not, and all are cached in the same way. Hence, if one client does not require caching, but another client does, client one's disk will have to be cached so that client two's disk can be cached. As another example, perhaps each of 100 clients is assigned 1/100 of the available memory space for caching but client one's data is accessed in much larger segments than is client two's data. Regardless, both clients' data will be accessed in the same way (typically by accessing a certain number of sectors or clusters).

Because disk caching is done on a physical disk or file basis, inefficient use of storage resources may result. For example, one client may be assigned disk drive one for data storage and another client may be assigned disk drive two for data storage. If client one needs more space for storage, client one can't use part of client two's available disk space, because all of disk two is assigned to client two. Another disk drive (e.g., disk three) must be assigned to client one, leading to potential inefficient use of storage resources: client two might only be using 20% of its storage capacity and client one might only be using 50% of its storage capacity (disks one and three).

Finally, caching systems are not readily tunable. In order to change the caching characteristics, the system typically must be taken down and re-initialized. Hence, disk caching can be inflexible and inefficient.

It would be helpful if caching could be based on client needs rather than on physical devices. It would also be helpful if storage usage and caching characteristics could be dynamically tuned based on client data usage patterns. The present invention addresses these needs.

SUMMARY OF THE INVENTION

The present invention provides systems and methods, whereby a pool of global memory can be allocated among a set of client/servers so that each volume associated with a client/server is allocated a portion of cache memory in the global cache memory space. The amount of memory to be used for caching the volume's input/output operations (I/Os), the cache type, the cache replacement policy, and the maximum cache I/O read size are individually settable, can be specified by volume and can be changed dynamically without stopping volume caching. The cache page size can also be specified by volume, but caching must be inactive for initial setting or any changes. Volume caching I/O statistics may be collected on an individual volume basis.

BRIEF DESCRIPTION OF THE DRAWINGS

The foregoing summary, as well as the following detailed description of embodiments of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Figure 1:
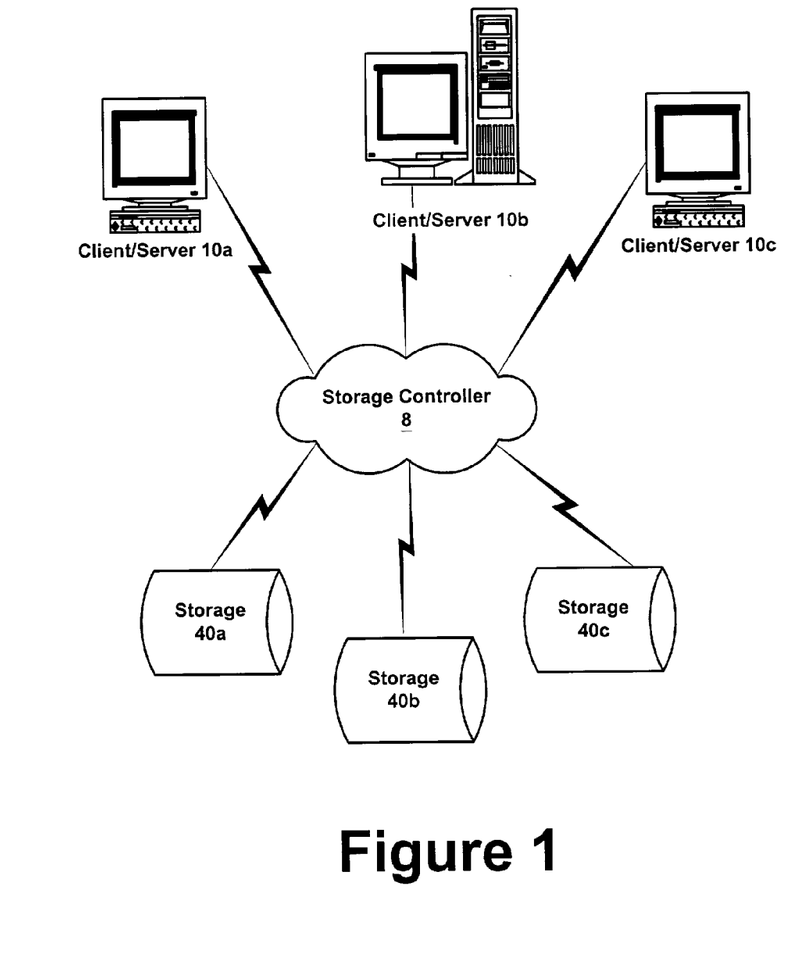
FIG. 1 is a block diagram of a Storage Area Network.

FIG. 1 is a block diagram of an exemplary Storage Area Network (SAN). Client/servers 10a, 10b, 10c etc. are in communication with a storage controller 8. Storage controller 8 controls access of client/servers 10*a*, 10*b*, 10*c* etc. to storage units 40*a*, 40*b* and 40*c*. Typically, storage controller 8 assigns one or more particular storage units to a client/server. Hence, for example, in FIG. 1 perhaps storage unit 40*a* is assigned to client/server 10*a*, storage unit 40*b* is assigned to client/server 40*b* and so on.

Figure 2:
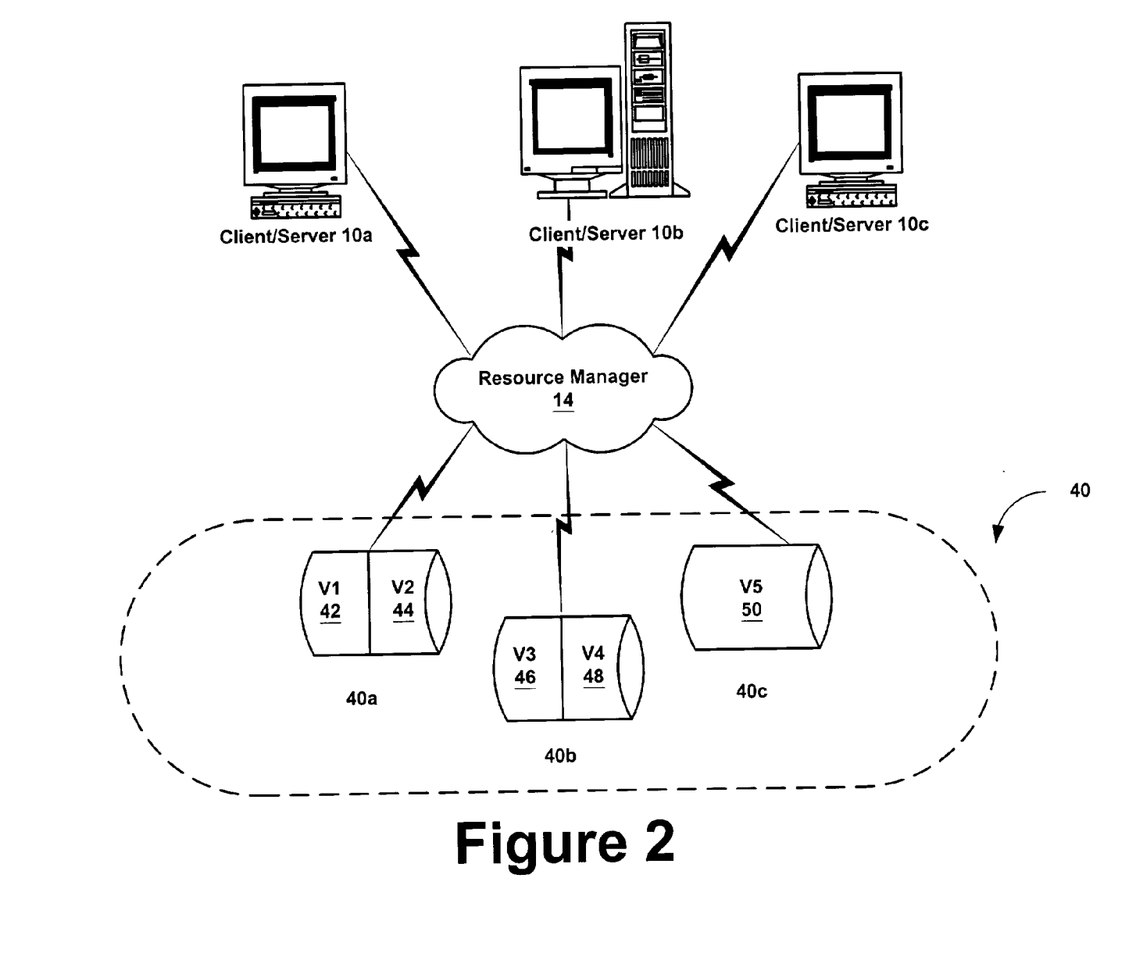
FIG. 2 is a block diagram of a Storage Area Network in accordance with one embodiment of the present invention.

FIG. 2 illustrates a Storage Area Network in accordance with one embodiment of the present invention. Client/servers 10*a*, 10*b*, 10*c* etc. are in communication with a resource manager 14. Resource manager 14 controls access of client/servers 10*a*, 10*b*, 10*c*, etc. to storage assets 40. Storage assets 40 include one or more storage units, which in FIG. 2, are represented by storage devices 40*a*, 40*b*, 40*c*, etc. In accordance with the present invention, however, storage devices 40*a*, 40*b*, 40*c*, etc. are partitioned into one or more volumes (represented in FIG. 2 as V1 42, V2 44, V3 46, V4 48 and V5 50). Each client/server 10*a*, 10*b*, 10*c* is associated with one or more volumes, V1 42, V2 44, V3 46, V4 48 or V5 50, so that, for example, client/server 10*a* may be assigned to volume 1 (V1) 42 of storage unit 40*a* and client/server 10*b* may be assigned to volume 2 (V2) 44 of the same storage unit 40*a* and so on. As described further below, each volume is assigned a separate volume disk caching space (not shown in FIG. 2). Because client/server 10*a* is assigned to a separate volume than is client/server 10*b* and each volume has its own volume disk caching space, even though client/server 10*a* and 10*b* share the same physical disk, 40*a*, client/server 10*a* is not able to access client/server 10*b*'s data and vice versa Attributes of the volume disk caching space include the following: the amount of memory to be used for caching the volume's input/output operations (I/Os), the cache page size (the size of each cache page for the volume, where the size of the cache page is a multiple of the hosting computing device's operating system page size), the cache type (which type of caching method (e.g., write through, write back, etc.) will be used for the volume), the cache replacement policy (e.g., Least Frequently Used versus Least Recently Used), and the maximum cache read I/O size, (i.e., the largest read IO operation that will be cached). The amount of memory to be used for caching the volume's input/output operations (I/Os), and the maximum cache read I/O size, (i.e., the largest read I/O operation that will be cached) can be changed dynamically for a volume without stopping caching. I/O statistics may be collected by volume. I/O statistics include read hits per volume, read misses per volume and the like.

Figure 3:
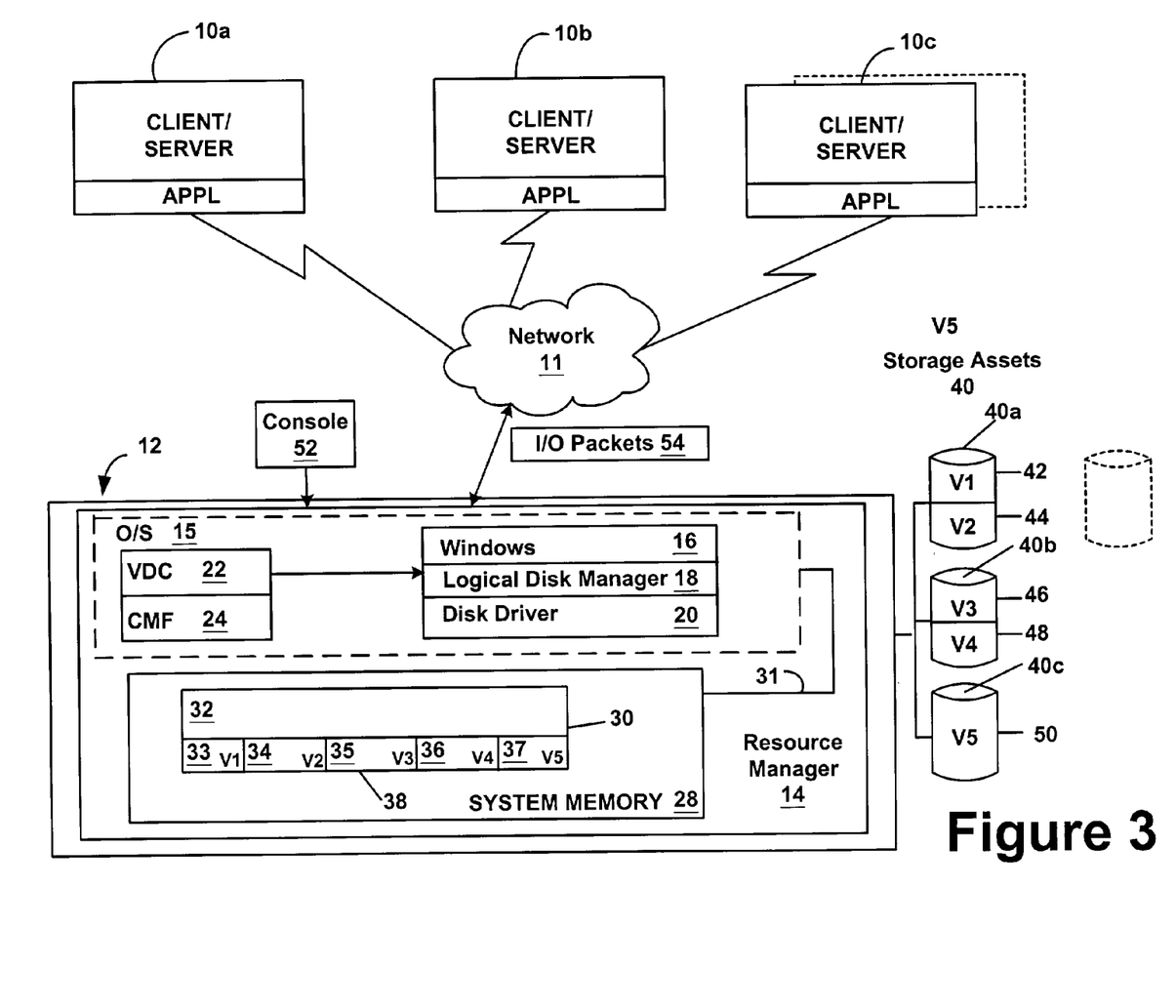
FIG. 3 is a block diagram of a volume-based disk caching system in accordance with one embodiment of the invention.

FIG. 3 illustrates an environment in which a system for volume-based disk caching in accordance with one embodiment of the invention may be implemented. Client/servers 10*a*, 10*b*, 10*c*, etc. are communicatively coupled via network 11 to a computing device 12 on which is resident resource manager 14. Coupled to computing device 12 are storage assets 40. The computing device on which resource manager 14 is resident may be any computing device 12 including, but not limited to: a personal computer (PC), an automated teller machine, a server computer, a hand-held or laptop device, a multi-processor system, a microprocessor-based system, programmable consumer electronics, a network PC, a minicomputer, a mainframe computer, and the like. The computing device 12 may include resource manager 14, an operating system 15 and a system memory 28 connected by a system bus 31. The computing device 12 may include a variety of computer readable media. Computer readable media can be any available media that can be accessed by the computing device 12 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computing device 12. Communication media typically embodies computer readable instructions, data structures, program modules or other data in a modulated data signal such as a carrier wave or other transport mechanism and includes any information delivery media. In one embodiment computing device 12 includes a number of resource managers 14 (e.g., 12 or fewer).

System memory 28 may be volatile (such as RAM), non-volatile (such as ROM, flash memory, etc.) or some combination of the two. System memory 28 in one embodiment of the invention includes global cache memory space 30. Global cache memory space 30 includes free global cache memory space 32 (memory not assigned to any specific volume) and volume disk caching space 38, represented in FIG. 3 as portioned into individual volume disk caching spaces V1 33, V2 34, V3 35, V4 36 and V5 37. Free global cache memory space 32 is global cache memory space 30 that has not been assigned to volumes. Individual volume disk caching spaces are assigned or associated with individual storage device volumes. In FIG. 3, individual volume disk caching space V1 33 has been assigned to volume 1 V1 42 of storage device 40*a*, volume disk caching space V2 34 has been assigned to volume 2 V2 44 of storage device 40*a* and so on. It will be understood that global cache memory space 30 may include any number of individual volume disk caching spaces, the individual volume disk caching spaces represented in FIG. 3 by V1 33, V2 34, V3 35, V4 36 and V5 37 are merely exemplary. Similarly individual volume disk caching spaces V1 33, V2 34, V3 35, V4 36 and V5 37 may be of the same size (occupy the same amount of memory) or may be of different size (occupy different amounts of memory).

Storage devices 40 may be any suitable kind of storage devices that can be partitioned into logical volumes. The resource manager 14 manages storage assets 40, (represented in FIG. 3 by storage devices 40*a*, 40*b*, 40*c*, etc.), from an enterprise-wide perspective by virtualizing storage; that is, storage is not defined in terms of discrete devices or subsystems but as a collective pool of storage capacity. The pool can be allocated among a number of client/servers 10*a*, 10*b*, 10*c*, etc. according to rules established by, for example, a storage administrator. These rules (not shown) may be stored in a datastore. For example, in FIG. 3, storage assets 40 include disks 40*a*, 40*b* and 40*c*. Disk 40*a* has been partitioned into volume 1 V1 42 and volume 2 V2 44. Disk 40*b* has been partitioned into volume 3 V3 46 and volume 4 V4 48 and disk 40*c* comprises volume 5 V5 50. It should be understood that the way disks 40*a*, 40*b* and 40*c* are partitioned in FIG. 3 is merely exemplary. Disks 40*a*, 40*b*, 40*c*, etc. may be partitioned into any suitable number of volumes. Similarly, a single volume may span any suitable number of disks, for example, volume 1 in another embodiment may include disk 40*a* and 40*b*, and so on.

The resource manager 14 is in the data path so that all traffic (generally in the form of input/output request packets 54) between the client/servers 10a, 10b, 10c, etc. and the storage assets 40, is routed through network 11 to resource manager 14. The resource manager 14 in one embodiment of the invention includes a volume disk cache driver 22. The resource manager 14 may also include a centralized management facility (CMF) 24.

The volume disk cache driver 22 may be implemented as an upper level filter of a logical disk manager 18 (such as, but not limited to, the Logical Disk Manager (LDM) for Microsoft® Windows® 2000) so that input/output requests are intercepted by the volume disk cache driver 22 before the request is passed on to the logical disk manager 18 and from the logical disk manager 18 to the disk driver 20. The volume disk cache driver 22 determines if the data that is the subject of the I/O request packet 54 is present in the individual volume disk caching space V1 33, V2 34, V3 35, V4 36 or V5 37 associated with the volume specified in the I/O request packet 54. If the data is present, the data is retrieved from the individual volume disk caching space V1 33, V2 34, V3 35, V4 36 or V5 37 and the I/O request is never passed on to the logical disk manager 18 and disk driver 20. If the data is not present in the individual volume disk caching space V1 33, V2 34, V3 35, V4 36 or V5 37 associated with the volume specified in the I/O request packet 54, the I/O request is passed on to the logical disk manager 18 and disk driver 20 and the I/O operation is performed. Upon return, however, disk driver 20 and logical disk manager 18 return control to volume disk cache driver 22. Logical disk cache driver 22 stores the retrieved data in the individual volume disk caching space V1 33, V2 34, V3 35, V4 36 or V5 37 associated with the volume from which the data was retrieved.

The logical disk manager 18 may, for example, be a subsystem of Windows® 2000 that consists of user mode and device driver mode components and typically manages storage devices such as storage devices 40a, 40b, 40c, etc.

By designing the volume disk cache driver 22 at this level, (i.e., as an upper level filter of the logical disk manager 18), all the device-specific characteristics (whether the device is a simple-volume, spanned volume, RAID volume, striping-enabled volume, etc.) are managed by the logical disk manager 18 and are transparent to the volume disk cache driver 22. In another embodiment, the volume disk cache driver 22 performs the functions of the logical disk manager 18 and disk driver 20 in addition to volume disk caching.

In one embodiment of the invention, the volume disk cache driver 22 is implemented in accordance with the standard Microsoft® Windows® 2000 Driver Model. The Microsoft® Windows® 2000 model provides a framework for device drivers that operate in Microsoft® Windows® 2000 and later MICROSOFT operating systems. By implementing volume disk cache driver 22 in accordance with the Microsoft® Windows® 2000 model, the volume disk cache driver 22 can be offered as a stand-alone product offering enhanced disk caching capabilities on any MICROSOFT Windows® server or on any server that adheres to the Microsoft® Windows® 2000 model.

The volume disk cache driver 22 is designed to improve the data access speed of client/servers 10a, 10b, 10c, etc. across the network 11 by implementing a volume-based cache, thereby providing client/servers 10a, 10b, 10c, etc. high-speed access to frequently used data. Once data is read from a logical volume, the data is stored in cache memory. Subsequent access to that same data will retrieve it from the cache memory instead of requiring a direct access to the volume on which the data is stored. As described above, each individual formatted volume, volume 1 V1 42, volume 2 V2 44, volume 3 V3 46, volume 4 V4 48, volume 5 V5 50, etc., enabled to the resource manager 14 may have its own cache memory: for example, volume 1 V1 42 may be associated with individual disk caching space (i.e., memory) V1 33, volume V2 44 with individual disk caching space (i.e., memory) V2 34, volume 3 V3 46 with individual disk caching space (i.e., memory) V3 35, volume 4 V4 48 with individual disk caching space (i.e., memory) V4 36, volume 5 V5 37 with individual disk caching space (i.e., memory V5 37) and so on. The individual disk caching spaces 38 are allocated in the global cache memory 30. The volume disk cache driver 22 enables the client/servers 10a, 10b, 10c, etc. to read data from and write data to system memory 28 instead of from physical disks 40a, 40b, 40c, etc.

In one embodiment, the CMF 24 provides an interface between a user and the resource manager 14. In one embodiment, user commands input at console 52 may be translated by the CMF 24 into commands that initiate cache functions. The CMF 24 may control allocation and de-allocation of global cache memory space 30 and individual volume disk cache spaces V1 33, V2 34, V3 35, V4 36 and V5 37 through setting or changing the value of attributes. The CMF 24 in one embodiment can increment and decrement the size of both global cache memory space 30 and volume disk cache spaces V1 33, V2 34, V3 35, V4 36 and V5 37 at any time that the resource manager 14 is running, without interruption of disk caching. It will be understood that changing the size of global cache memory space 30 affects the amount of physical memory available to the operating system 15 and any applications running on the system. Similarly, changing the size of an individual volume disk cache space, such as V1 33, V2 34, V3 35, V4 36 or V5 37, for example, may change the distribution of the currently allocated global cache memory space 30.

The CMF 24 in one embodiment of the invention will validate any parameters representing values of volume-based attributes of the individual volume disk caches that it passes to volume disk cache driver 22. In one embodiment, the CMF 24 will also retain all global cache memory space 30 and individual volume disk cache spaces V1 42, V2 44, V3 46, V4 48 and V5 50 attributes across CMF 24 instantiations (e.g., across computing device 12 reboots). The CMF 24 may also reissue the proper commands to the volume disk cache driver 22 to reconfigure the memory space 30 and individual disk volume caching spaces V1 33, V2 34, V3 35, V4 36 and V5 37.

Attributes of the individual volume disk caching spaces V1 33, V2 34, V3 35, V4 36 and V5 37 include the following: the amount of memory to be used for caching the volume's input/output operations (I/Os), the cache page size (the size of each cache page for the volume, where the size of the cache page is a multiple of the hosting computing device's operating system page size), the cache type (which type of caching method (e.g., write through, write back, etc.) will be used for the volume), the cache replacement policy (e.g., Least Frequently Used, Least Recently Used, etc.) and the maximum cache read I/O size, (i.e., the largest read IO operation that will be cached). The amount of memory to be used for caching the volume's input/output operations (I/Os), and the maximum cache read I/O size, (i.e., the largest read IO operation that will be cached) can be changed dynamically for a volume without stopping caching. I/O statistics may be collected by volume. I/O statistics include read hits per volume, read misses per volume and the like.

Figure 4:
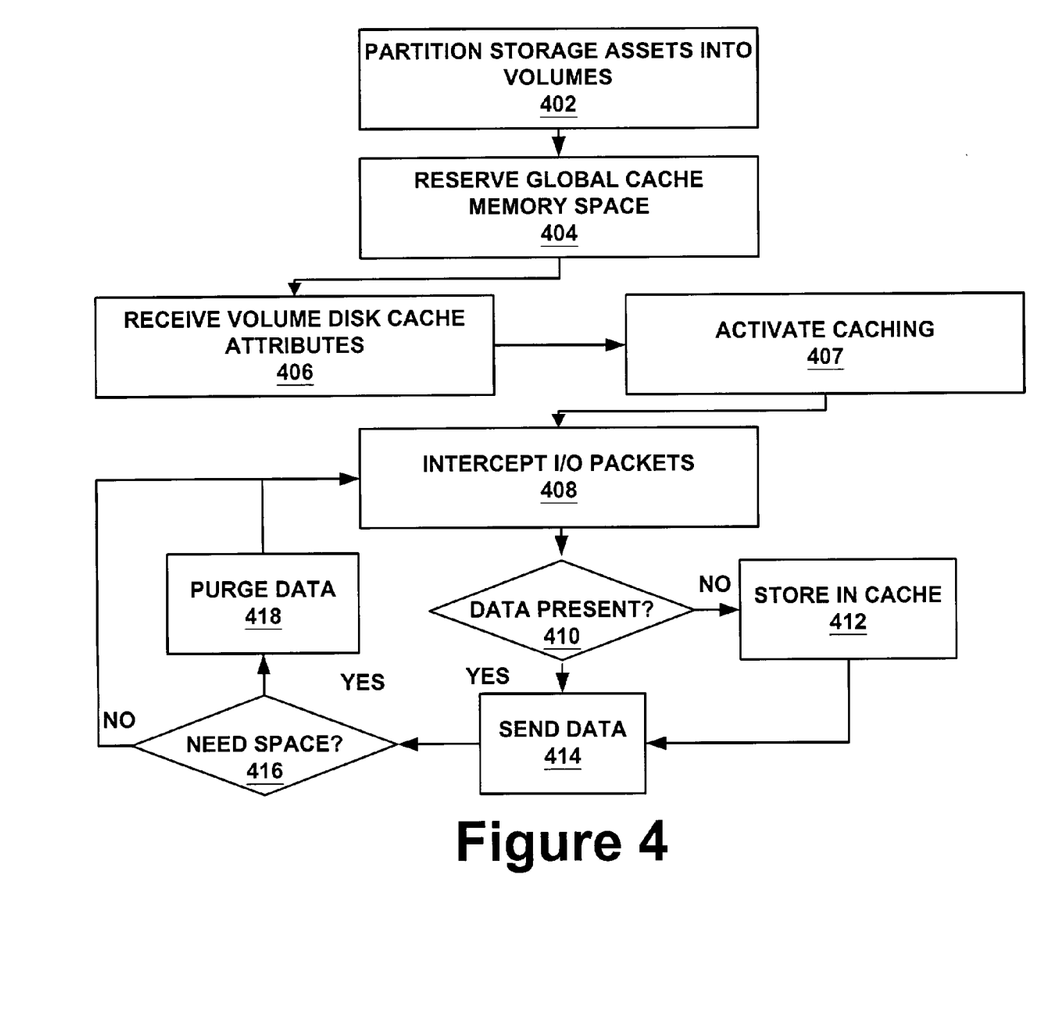
FIG. 4 is a flow diagram of a method for volume-based caching in accordance with one embodiment of the invention.

FIG. 4 is a flow diagram of a method for setting up volume-based caching in accordance with one embodiment of the invention. Referring now concurrently to FIGS. 3 and 4, at step 402 storage assets 40 are partitioned into volumes, (e.g., physical device 40*a* is partitioned into logical volume 1 V1 42 and logical volume 2 V2 44, physical device 40*b* is partitioned into logical volume 3 V3 46 and logical volume 4 V4 48 and physical device 40*c* comprises logical volume 5 V5 50).

At step 404 a user-defined subset of system memory 28 is reserved for volume disk caching. This space is referred to as global cache memory space 30. In one embodiment, this subset of system memory 28 is reserved for volume disk caching when the system is initialized. Because global cache memory space is obtained by reserving a portion of the computing device 12's system memory 28, less memory is available for operating system 15 (e.g., WINDOWS®operating system) or for application use. A system administrator typically assigns the actual amount of physical memory allocated as global cache memory space 30 when the volume disk cache driver 22 is installed. In one embodiment, the amount of memory allocated to global cache memory space 30 can be increased or decreased (e.g., by a system administrator using console 52 to interface with CMF 24) as needs dictate.

Once the global cache memory space 30 has been allocated, portions of the global cache memory space 30 may be allocated to individual volumes, volume V1 42, volume 2 V2 44, volume 3, V3 46, volume 4 V4 48, volume 5 V5 50, etc. Each cached volume can have a different amount of cache memory allocated for its use. The amount of cache memory space assigned to a particular volume can be changed without interrupting caching.

At step 406 one or more sets of parameters or attribute values that determines the volume disk caching characteristics for each particular volume is received. Attributes of the volume disk caching space may include any or all of the attributes described above with respect to FIGS. 2 and 3. In addition I/O statistics may be collected by volume. I/O statistics include read hits per volume, read misses per volume and the like. In one embodiment of the invention, the volume-based attributes are input from console 52, received by the CMF 24, validated and formatted into commands sent to the volume disk cache driver 22.

It should be noted that the attribute values for each volume are independent of the attribute values for all other volumes, so that, for example, 10 Gigabytes of memory may be reserved for volume 1 V1 42 caching and 100 Gigabytes of memory may be reserved for volume 1 V2 44 caching. Similarly, for example, the page size for V1 33 may be set at 4K and the page size for V2 34 may be set at 16K or 64K. In one embodiment of the invention, page size is a multiple of 4K.

At step 407, caching is activated.

At step 408 an I/O request packet 54 is received (intercepted). In one embodiment of the invention, I/O request packet 54 directed to one of storage devices 40*a*, 40*b*, 40*c*, etc. is received at resource manager 14 from client/server 10*a*, 10*b*, or 10*c*, etc. via the network 11. Each I/O request packet 54 includes, in one embodiment, parameters including: volume identifier, request size and start logical sector address. Volume identifier in one embodiment of the invention is a unique identifier used to distinguish between volumes. In the example, volume identifier may refer to which volume, volume 1 V1 42, volume 2 V2 44, volume 3 V3 46, volume 4 V4 48 or volume 5 V5 50, the request is directed. Request size refers to the size of the data requested and start logical sector address refers to the location on the storage device where the requested information can be found. The start logical sector address may also determine where data in the volume disk cache space is to be read. Based on the parameters in the I/O request packet 54, the volume disk cache driver 22 knows where to read, store and update the data in both the individual volume disk cache space V1 33, V2 34, V3 35, V4 36 or V5 and on the logical volume, volume 1 V1 42, volume 2 V2 44, volume 3 V3 46, volume 4 V4 48 or volume 5 V5 50.

As I/O requests are made, the volume disk cache space 38 is filled. With each read request, the volume disk cache driver 22 checks to see if the region being read has already been stored in the specified individual volume disk cache space. If all the data is in the specified individual volume disk cache space, the data is moved into a buffer associated with the input I/O request packet 54 and the user request is completed.

Hence, in one embodiment, the resource manager 14 directs the I/O request packet 54 to the volume disk cache driver 22. At step 410, it is determined whether the data requested in I/O request packet 54 is available in the volume disk cache space 38. If it is determined that the data is available in the individual volume disk caching space V1 32, V2 33. V3 34, or V4 35 assigned to the volume, at step 414, the data will be retrieved from the specified individual disk caching space V1 32, V2 33. V3 34, or V4 35 and sent to the requester. If it is determined that the data is not available from the individual volume disk caching space V1 32, V2 33, V3 34, or V4 35 assigned to the volume specified in the I/O request packet 54, the data will be retrieved from the specified volume at step 412 and returned to the requestor at step 414.

If the region being read has not already been stored in the specified individual volume disk cache space V1 32, V2 33. V3 34, or V4 35, a read command is generated and is issued to the volume. The read preferably starts with the first page needed to fetch data into the specified individual volume disk caching space V1 32, V2 33. V3 34, or V4 35 and will proceed to the last page needed to satisfy the read request. Once a read start point is established, any succeeding pages that are already in the cache preferably are treated as not being present (marked as invalid). This may be more efficient as one large read is likely to require less time than the multiple smaller reads needed if all non-contiguous page hits for a given user request were honored. When the read completes, the user data, plus additional data if the user request was not on cache page boundaries, is in the specified individual volume disk caching space. The requested data is moved to the user buffer and the requestor's I/O request is completed. In one embodiment, the read request generated by the volume disk cache driver 22 is built on cache page boundaries so that a disk cache page is the smallest unit of accessible cached data for a particular volume. In one embodiment, the starting address will be rounded down to a modulo-page-size boundary and the length rounded up to a modulo-page-size, such that a minimum of the entire requested region is read, preferably providing a baseline look-ahead capability. Alternatively, other predictive methods of read look-ahead may be employed such as gathering statistics on patterns of volume access in order to determine heuristics on which to determine the size of the read region.

In one embodiment, if the I/O request packet 54 includes a read or write request and the data is not in the individual volume disk caching space V1 32, V2 33, V3 34, or V4 35, the data that is not in the individual volume disk caching space V1 32, V2 33, V3 34, or V4 35 will be stored to the specified individual volume disk caching space V1 32, V2 33, V3 34, or V4 35. In one embodiment, if the I/O request packet 54 includes a write request, the write request will update the data previously stored in the specified individual volume disk cache space V1 32, V2 33, V3 34, or V4 35 as well as on the storage media volume 1 V1 42, volume 2 V2 44, volume 3 V3 46, volume 4 V4 48 or volume 5 V5 50, allowing subsequent reads of the altered data to again benefit from having the data in volume disk caching space 38.

Periodically, old data must be removed from the volume disk caching space 38 so that new data can be stored. At step 416 it is determined if data needs to be purged. If data does not need to be purged, processing continues at step 408. If data needs to be purged, the data is purged and processing continues at step 408. In one embodiment, the volume disk cache driver 22 maintains a history of each time each cache page is accessed and, when pages must be purged, the oldest or least-recently-used pages are purged first. In another embodiment, the volume disk cache driver 22 may apply heuristics based on statistics gathered on volume access to decide which pages to purge.

The methods and system described above may be embodied in the form of program code (i.e., instructions) stored on a computer-readable medium, such as a floppy diskette, CD-ROM, DVD-ROM, DVD-RAM, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level programming language, such as, for example, C, C++, or Java. Alternatively, the program code may be implemented in assembly or machine language. In any case, the language may be a compiled or an interpreted language.

It is noted that the foregoing examples have been provided merely for the purpose of explanation and are in no way to be construed as limiting of the present invention. While the invention has been described with reference to preferred embodiments, it is understood that the words used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for accessing data on a computer storage medium, comprising:
   at least one storage unit coupled to a resource manager, the at least one storage unit partitioned into at least one of a plurality of volumes;
   the resource manager managing a pool of available memory, wherein the pool is allocated among the plurality of volumes according to a set of attributes associated with each volume, wherein the set of attributes comprises a size of caching space that can be changed dynamically, and wherein the pool of available memory may be dynamically reallocated among the plurality of volumes.

2. The system of claim 1 wherein the set of attributes associated with each volume further comprises at least one of: a caching page size, a cache type, a cache replacement policy and a maximum cache read size.

3. The system of claim 2 wherein the maximum cache read size specified by volume can be changed dynamically.

4. The system of claim 1 further comprising at least one of a plurality of clients coupled to the resource manager, wherein the at least one client is associated with the at least one volume.

5. The system of claim 1 wherein the resource manager comprises a volume disk cache driver.

6. The system of claim 5 wherein the volume disk cache driver receives an input/output request from a requestor, the input/output request requesting data from a first volume, the first volume associated with a first volume disk cache space.

7. The system of claim 6 wherein the volume disk cache driver returns the requested data to the requestor from the first volume disk cache space.

8. The system of claim 1 wherein the resource manager further comprises an interface for changing the set of attributes associated with at least one volume of the plurality of volumes.

9. The system of claim 1 wherein the volume disk cache driver is implemented as a upper level filter to a logical disk manager.

10. A method of volume disk caching comprising:
    reserving a pool of memory for caching at least one of a plurality of logical disk volumes;
    receiving an attribute value associated with a size of the pool of memory to be reserved;
    allocating the pool of memory among the at least one of a plurality of logical disk volumes in accordance with a set of attributes associated with the at least one logical disk volume, wherein the set of attributes comprises a size of caching space that can be changed dynamically.

11. The method of claim 10 further comprising reserving the pool of memory from system memory.

12. The method of claim 10 further comprising dynamically reallocating the pool of memory in response to receiving an updated set of attributes associated with at least one of the volumes.

13. The method of claim 10 wherein the set of attributes includes an attribute for setting the amount of memory to be used for caching the at least one logical disk volume.

14. The method of claim 13, wherein the attribute can be changed without interrupting caching.

15. The method of claim 10 wherein the set of attributes includes an attribute for setting the size of each cache page for the at least one logical disk volume.

16. The method of claim 10 wherein the attributes includes an attribute for setting the type of caching to be used to write through caching.

17. The method of claim 10 wherein the set of attributes includes an attribute for setting the type of caching to be used to write back caching.

18. The method of claim 10 wherein the set of attributes includes an attribute for specifying a cache replacement policy.

19. The method of claim 18 wherein the attribute can be changed without stopping caching.

20. The method of claim 10 wherein the set of attributes includes an attribute for setting the size of the largest cache read operation.

21. The method of claim 20 wherein the attribute can be changed without stopping caching.

22. A computer-readable medium having stored thereon program code for performing volume-based caching, the program code when executed by a computer causing the computer to:

reserve a pool of memory for caching at least one of a plurality of logical disk volumes;

receive an attribute value associated with a size of the pool of memory to be reserved; and allocate the pool of memory among the at least one of a plurality of logical disk volumes in accordance with a set of attributes associated with the at least one logical disk volume, wherein the set of attributes comprises a size of caching space that can be changed dynamically.

* * * * *